(12) United States Patent
Kitagawa

(10) Patent No.: US 10,620,418 B2
(45) Date of Patent: Apr. 14, 2020

(54) OPTICAL PICKUP DEVICE

(71) Applicant: MITUTOYO CORPORATION, Kawasaki, Kanagawa (JP)

(72) Inventor: Kazuki Kitagawa, Yokohama (JP)

(73) Assignee: MITUTOYO CORPORATION, Kawasaki (JP)

( * ) Notice: Subject to any disclaimer, the term of this patent is extended or adjusted under 35 U.S.C. 154(b) by 181 days.

(21) Appl. No.: 15/296,530

(22) Filed: Oct. 18, 2016

(65) Prior Publication Data

US 2017/0131535 A1    May 11, 2017

(30) Foreign Application Priority Data

Nov. 9, 2015 (JP) ................. 2015-219704

(51) Int. Cl.

| G02B 21/18 | (2006.01) |
|---|---|
| G02B 21/24 | (2006.01) |
| G02B 7/36 | (2006.01) |
| G02B 21/08 | (2006.01) |
| G02B 27/10 | (2006.01) |

(52) U.S. Cl.
CPC .............. G02B 21/18 (2013.01); G02B 7/36 (2013.01); G02B 21/082 (2013.01); G02B 21/245 (2013.01); G02B 27/1093 (2013.01)

(58) Field of Classification Search
CPC ............................ G02B 21/245; G02B 27/141
See application file for complete search history.

(56) References Cited

U.S. PATENT DOCUMENTS

| 2002/0141319 A1* | 10/2002 | Matsumura ........... G11B 7/1381 |
|---|---|---|
| | | 369/112.05 |
| 2007/0242575 A1* | 10/2007 | Nakamura ............. G11B 7/131 |
| | | 369/44.24 |
| 2017/0212356 A1* | 7/2017 | Euteneuer ............ G02B 27/141 |

FOREIGN PATENT DOCUMENTS

| JP | H02-201741 A | 8/1990 |
|---|---|---|
| JP | 07-129977 | 5/1995 |
| JP | H07-129977 A | 5/1995 |
| JP | H10-142489 A | 5/1998 |
| JP | 2006-184777 A | 7/2006 |
| JP | 2008-261829 A | 10/2008 |

* cited by examiner

*Primary Examiner* — Tony Ko
(74) *Attorney, Agent, or Firm* — Rankin, Hill & Clark LLP

(57) ABSTRACT

An optical pickup device according to an embodiment of the present invention includes: a light source that outputs a light beam; an irradiation optical system that projects onto a measurement target the light beam outputted from the light source; an imaging optical system that converges and images the light beam reflected by the measurement target; a light receiving part that receives the light beam imaged by the imaging optical system; and a peak separation part that when the light beams reflected by a first surface and a second surface of the measurement target are assumed to be a first reflected beam and a second reflected beam, separates peaks of light intensity of the first and second reflected beams with respect to a distance between the irradiation optical system and the measurement target in the light receiving part.

2 Claims, 8 Drawing Sheets

OPTICAL PICKUP DEVICE

CROSS-REFERENCE TO RELATED APPLICATIONS

This application is based upon and claims the benefit of priority from the prior Japanese Patent Application No. 2015-219704, filed on Nov. 9, 2015, the entire contents of which are incorporated herein by reference.

BACKGROUND OF THE INVENTION

Field of the Invention

The present invention relates to an optical pickup device employed in the likes of a microscope.

Description of the Related Art

A knife edge method is known as one of focus detection methods of an optical pickup device employed in the likes of a microscope (for example, JP H7-129977 A). This knife edge method is a method in which a light intensity distribution of a light beam is found by dividing by the likes of a triangular prism a light beam reflected from a workpiece, and obtaining from this light intensity distribution information of a position (a focus position) of the workpiece with respect to a condensing position of an object lens.

However, although on the one hand this knife edge method has an advantage that a focus detection range is broad, in the knife edge method, when focus detection is performed on a workpiece of a transparent body of the likes of glass, it ends up that two reflection surfaces, that is, a surface and aback, are included in that focus detection range. Therefore, the knife edge method has a problem that focus detection signals generated by these two reflection surfaces end up being mixed and focus errors more easily occur.

The present invention was made in view of such a problem, and has an object of providing an optical pickup device achieving high precision focusing on a workpiece of a transparent body.

SUMMARY OF THE INVENTION

An optical pickup device according to an embodiment of the present invention includes: a light source that outputs a light beam; an irradiation optical system that projects onto a measurement target the light beam outputted from the light source; an imaging optical system that converges and images the light beam reflected by the measurement target; a light receiving part that receives the light beam imaged by the imaging optical system; and a peak separation part that when the light beams reflected by a first surface and a second surface of the measurement target are assumed to be a first reflected beam and a second reflected beam, separates peaks of light intensity of the first and second reflected beams with respect to a distance between the irradiation optical system and the measurement target in the light receiving part.

By a light beam reflected from a workpiece of a measurement target being received obliquely to a light receiving part in the present embodiment, the present embodiment makes it possible for peaks of light intensity in the light receiving part of a light beam reflected by a workpiece surface and a light beam reflected by a workpiece back to be separated, even if the workpiece is a transparent body. Therefore, the present embodiment makes it possible to provide an optical pickup device in which focus errors during focus detection on a workpiece of a transparent body can be reduced, and that achieves high precision focusing.

DETAILED DESCRIPTION OF THE EMBODIMENTS

Optical pickup devices according to embodiments of the present invention will be described below with reference to the drawings.

First Embodiment

First, a configuration of an optical pickup device 120 according to a first embodiment will be described.

Figure 1:
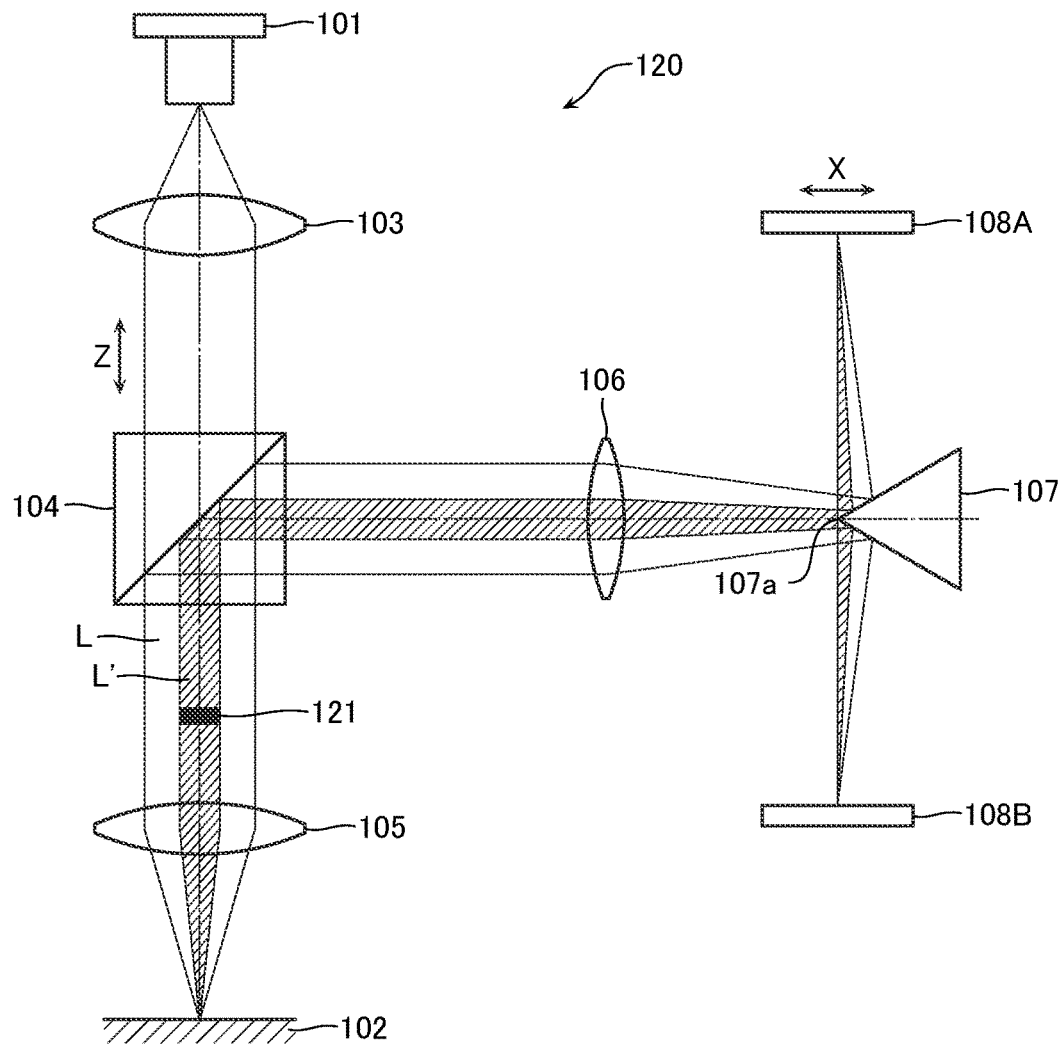
FIG. 1 is a view showing a configuration of an optical pickup device according to a first embodiment.

FIG. 1 is a view showing a configuration of the optical pickup device according to the present embodiment.

The optical pickup device 120 adopts a knife edge method as a focus detection method. The optical pickup device 120 includes: a semiconductor laser 101 being a light source; an irradiation optical system provided between the semiconductor laser 101 and a workpiece 102 being a measurement target; and an imaging optical system provided between the workpiece 102 and a light receiving part. The irradiation optical system is configured by a collimator lens 103 and an object lens 105 that are disposed in a Z direction from the semiconductor laser 101 to the workpiece 102. The imaging optical system is configured by a beam splitter 104, an imaging lens 106, and a triangular prism 107 being a mirror that are disposed from the workpiece 102 to the light receiving part.

A light beam L outputted from the semiconductor laser 101 is converted to parallel light, and then condensed by the object lens 105 to be projected onto a measurement surface of the workpiece 102. The light beam L reflected by the measurement surface of the workpiece 102 passes through the object lens 105 and is reflected by the beam splitter 104 to enter and be converged by the imaging lens 106. Moreover, this light beam L is divided into two directions by the triangular prism 107, and then imaged on light receiving surfaces of two line sensors 108A and 108B that configure the light receiving part. Each of the line sensors 108A and 108B includes a light receiving surface having a plurality of light receiving elements arranged in an X direction therein.

In the description below, the line sensors 108A and 108B are sometimes also referred to simply as a "line sensor 108", except when there is a need to specify. The light beam L up to being reflected by the workpiece 102 is sometimes also referred to as an "irradiating beam", and the light beam L that has been reflected by the workpiece 102 is sometimes also referred to as a "reflected beam". Moreover, light intensity of the reflected beam detected by the line sensor 108 is sometimes also referred to as "signal intensity".

Now, the triangular prism 107 is an optical means that changes an imaging form in the line sensor 108 by a focusing state on the workpiece 102 being the measurement target. The triangular prism 107 is disposed such that one of its vertex angle parts 107a faces an imaging lens 106 side to be positioned on an optical axis of the imaging lens 106. As a result, the reflected beam L converged by the imaging lens 106 is divided up and down to be received by the line sensor 108. Moreover, the line sensor 108 is disposed such that a position of the light receiving surface is in a conjugate relationship with a focal position of the object lens. Note that in the example of FIG. 1, the reflected beam L is divided in two in the triangular prism 107 to be received by the line sensors 108A and 108B, but one of these line sensors 108A and 108B may be omitted.

Furthermore, the optical pickup device 120 includes a light shielding plate 121 that shields a certain range L' including an optical axis of the light beam L on an optical path of the light beam L. This light shielding plate 121 functions as a peak separation part that, in focus detection on the workpiece 102 of a transparent body, separates peak positions of signal intensity distributions of a reflected beam of a surface of the workpiece 102 and a reflected beam of a back of the workpiece 102. In the description below, the certain range L' including the optical axis of the light beam L will sometimes also be referred to as a "range-to-be-adjusted". In FIG. 1, the range-to-be-adjusted L' is shown by oblique lines. Note that in the example of FIG. 1, the light shielding plate 121 is disposed between the beam splitter 104 and the object lens 105, but provided it is on the optical path of the light beam L, it may be disposed anywhere between the semiconductor laser 101 and the line sensor 108.

Next, advantages of the optical pickup device 120 will be described using an optical pickup device 100 according to a comparative example. Now, the optical pickup device 100 has a configuration having the light shielding plate 121 excluded from the optical pickup device 120.

Figure 12:
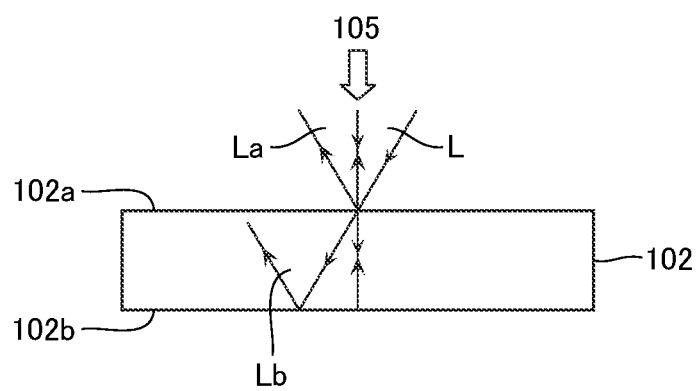
FIG. 12 is a view showing a state of reflection of a light beam in a workpiece of an optical pickup device according to a comparative example.

FIG. 12 is a view showing a state of reflection of a light beam in a workpiece of the optical pickup device according to the comparative example. FIG. 12 shows the case where the workpiece 102 is irradiated by as much as half of the light beam L, in order that features of a knife edge method in the optical pickup device 100 become apparent.

FIG. 12 is an example where a transparent body of the likes of glass has been adopted as the workpiece 102, and a position of a surface 102a of the workpiece 102 is in focus. As shown in FIG. 12, when the workpiece 102 is a transparent body of the likes of glass, not all of the irradiating beam L is reflected by the surface 102a of the workpiece 102, and part of the irradiating beam L is transmitted to a back 102b. As a result, it ends up that the reflected beam L includes: a component La reflected by the surface 102a of the irradiating beam L; and a component Lb reflected by the back 102b of the irradiating beam L. In the description below, the component La reflected by the surface 102a will sometimes also be referred to as a "surface reflected beam", and the component Lb reflected by the back 102b will sometimes also be referred to as a "back reflected beam".

Figure 13:
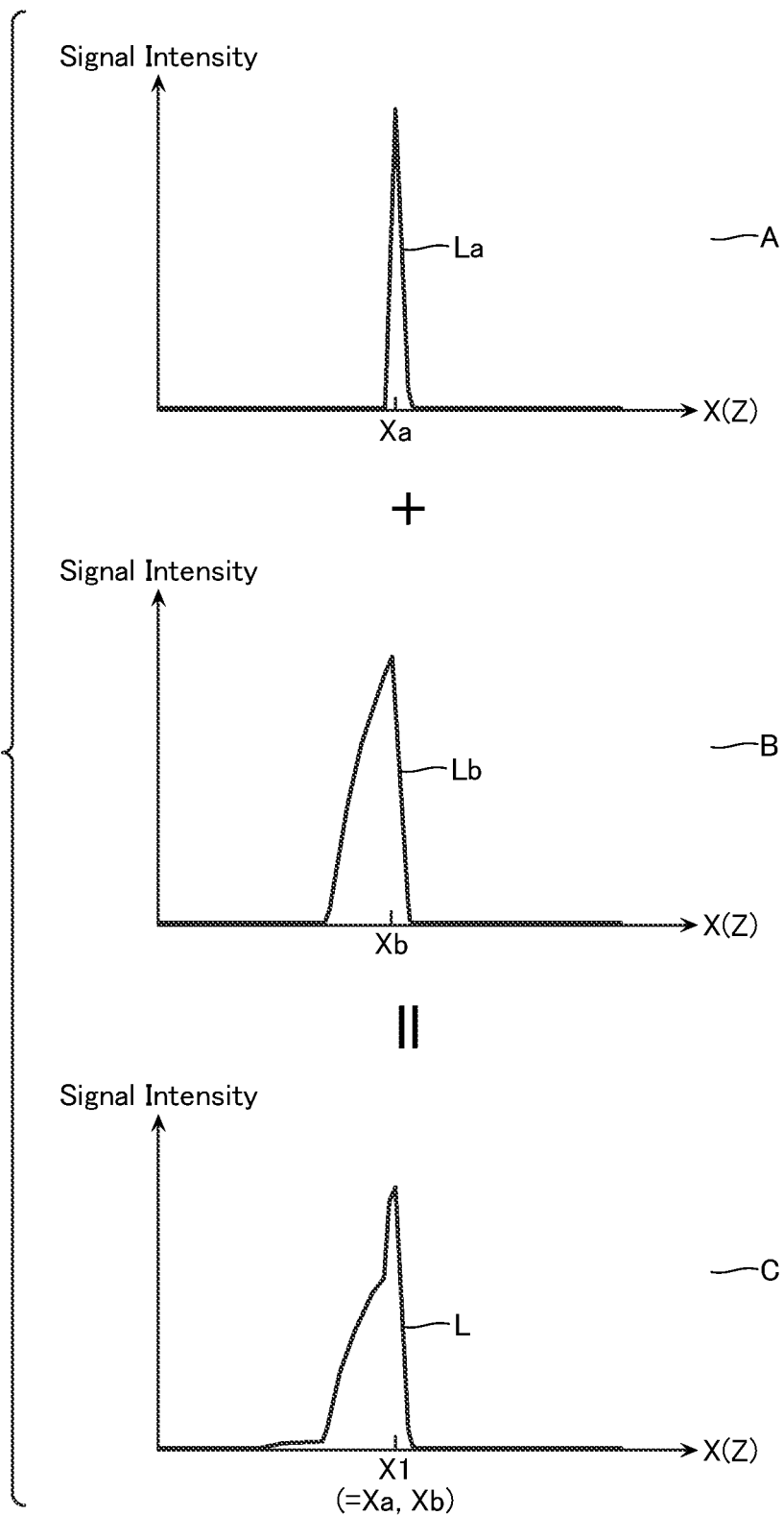
FIG. 13 includes graphs each showing a relationship between a position of a light receiving element of a line sensor and signal intensity, of the optical pickup device according to the comparative example.

FIG. 13 includes graphs each showing a relationship between a position of a light receiving element of a line sensor and signal intensity, of the optical pickup device according to the comparative example. In each of the graphs shown in FIG. 13, the horizontal axis is a position in the X direction of each of the light receiving elements of the line sensor 108, and the vertical axis is the signal intensity. The position in the X direction of each of the light receiving elements of the line sensor 108 corresponds to a distance in the Z direction between the irradiation optical system and the workpiece 102. Moreover, A in FIG. 13 shows signal intensity of the surface reflected beam La, B in FIG. 13 shows signal intensity of the back reflected beam Lb, and C in FIG. 13 shows overall signal intensity of the reflected beam L.

In the case of performing focus detection of the surface 102a of the workpiece 102, the back reflected beam Lb of the reflected beam L is essentially a component representing noise. In other words, in order to more accurately perform focus detection of the surface 102a of the workpiece 102, it becomes important to remove a signal of the back reflected beam Lb from a signal of the reflected beam L.

In this respect, in the case of the optical pickup device 100, the surface reflected beam La and the back reflected beam Lb are both reflected along the optical axis of the light beam L, hence, as shown in A and B in FIG. 13, peak positions Xa and Xb of their signal intensity distributions coincide at the same position X1 of the line sensor 108. Furthermore, in the case of FIG. 12, the back 102b is not in focus, hence the signal intensity distribution of the back reflected beam Lb ends up broadening in the X direction. As a result, as shown in C in FIG. 13, the signal intensity distributions of the surface reflected beam La and the back reflected beam Lb that have the position X1 as their peaks overlap, and the signal intensity of the reflected beam L ends up being distributed in a broad range. Therefore, it becomes difficult to separate the signal of the surface reflected beam La required for focus detection of the surface 102a of the workpiece 102 and the signal of the back reflected beam Lb representing noise. In other words, the optical pickup device 100 results in it becoming easier for focus errors to occur when performing focus detection of the surface 102a of the workpiece 102 of a transparent body having back reflection.

One of the main causes of this problem occurring is that a focus detection range of the knife edge method is broad, hence both surfaces, that is, the surface 102a and the back 102b, of the workpiece 102 end up being included in this focus detection range.

Accordingly, an optical pickup device adopting a pinhole confocal method instead of the knife edge method will be considered. The pinhole confocal method referred to herein is a method in which a pinhole and a light receiving part are disposed on the optical path of the reflected beam, and only a light quantity of the reflected beam is detected by the light receiving part. In this pinhole confocal method, the focus detection range is narrower compared to in the knife edge method, hence the pinhole confocal method makes it possible to catch only the reflected beam reflected by the surface of the workpiece. This optical pickup device makes it possible for mixing of the signal of the surface reflected beam and the signal of the back reflected beam in the light receiving part as in the optical pickup device 100, to be avoided. However, when the pinhole confocal method is adopted, the focus detection range narrows, hence convenience is more impaired compared to when the knife edge method is adopted.

Accordingly, an optical pickup device in which the knife edge method and the pinhole confocal method are switchable will be further considered. This optical pickup device makes it possible to perform focus detection by the knife edge method when the workpiece is not a transparent body, and perform focus detection by the pinhole confocal method when the workpiece is a transparent body. As a result, this optical pickup device makes it possible to reduce occurrence of focus errors during focus detection on a workpiece of a transparent body, while maintaining a broad focus detection range.

However, this optical pickup device has the following three problems. First, the knife edge method and the pinhole confocal method must be switched according to a type of the workpiece. In other words, it must be determined whether back reflection may occur in the workpiece to undergo focus detection, and both systems must be switched depending on a result of this determination. Particularly, when the optical pickup device is not provided with a function for determining the type of the workpiece, this determination must be performed by the user themselves. Second, in the case of the pinhole confocal method, even if it is known whether the workpiece is in focus or not, a direction of deviation with respect to a focus position is not known. In other words, in the pinhole confocal method, so-called copying autofocus cannot be performed. Third, in order to achieve switching of both systems, the light beam must be branched in some form or other. Therefore, signal intensity of the reflected beam ends up lowering. Particularly, a workpiece of a transparent body has a low reflectance in the first place, hence reflection intensity becomes weaker and weaker.

In that respect, the optical pickup device 120 enables the following advantages to be obtained.

Figure 2:
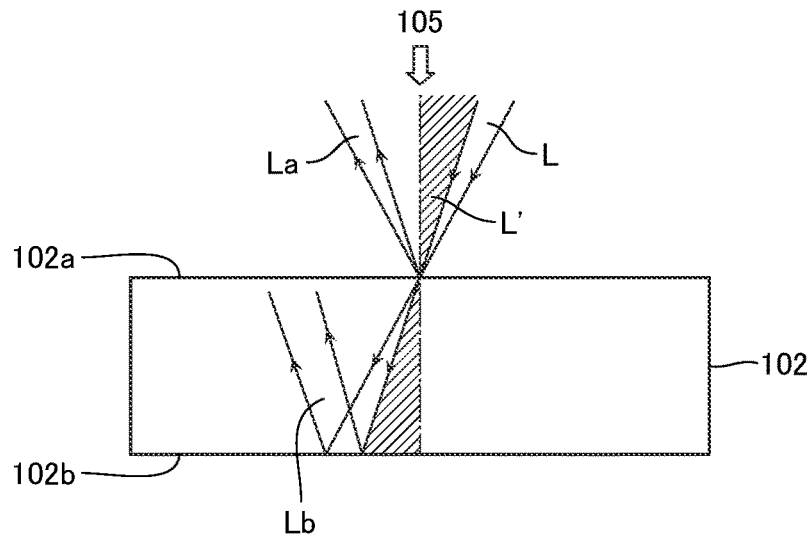
FIG. 2 is a view showing a state of reflection of a light beam in a workpiece of the optical pickup device according to the same embodiment.
Figure 3:
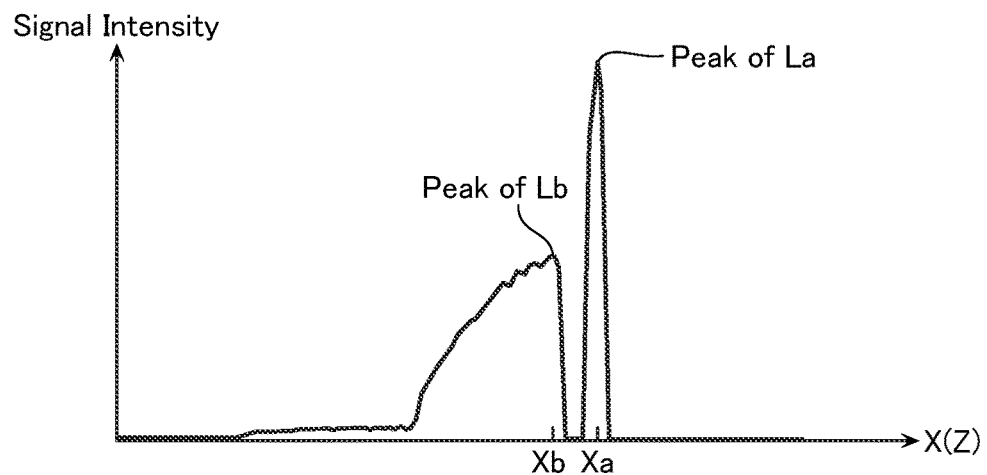
FIG. 3 is a graph showing a relationship between a position of a light receiving element of a line sensor and signal intensity, of the optical pickup device according to the same embodiment.

FIG. 2 is a view showing a state of reflection of the light beam in the workpiece of the optical pickup device according to the present embodiment. FIG. 2 shows the case where the workpiece 102 is irradiated by as much as half of the light beam L, in order that features of the knife edge method in the optical pickup device 120 become apparent. Moreover, FIG. 3 is a graph showing a relationship between a position of the light receiving element of the line sensor and signal intensity, of the optical pickup device according to the present embodiment. In the graph shown in FIG. 3, the horizontal axis is a position in the X direction of each of the light receiving elements of the line sensor 108, and the vertical axis is the signal intensity. The position in the X direction of each of the light receiving elements of the line sensor 108 corresponds to a distance in the Z direction between the irradiation optical system and the workpiece 102.

As a result of the optical pickup device 120, the light shielding plate 121 adjusts light intensity by shielding the range-to-be-adjusted L' of the light beam L, hence, as shown in FIG. 2, the light beam L is projected obliquely onto the workpiece 102 or the line sensor 108. In this case, as shown in FIG. 3, the peak positions Xa and Xb of the signal intensity distributions of the surface reflected beam La and the back reflected beam Lb appear separated to an extent of a portion that the range-to-be-adjusted L' is shielded of the light beam L. In other words, the optical pickup device 120, contrary to the optical pickup device 100, makes it possible for the peak of the signal intensity distribution of the surface reflected beam La to be easily detected.

From the above, the optical pickup device 120 makes it possible to reduce occurrence of focus errors during focus detection on a workpiece of a transparent body, while maintaining the advantage of the knife edge method of a broad focus detection range. Furthermore, the optical pickup device 120 makes it possible to employ the knife edge method regardless of the type of the workpiece 102, hence switching of the knife edge method and the pinhole confocal method becomes unnecessary.

Next, modified examples of the optical pickup device according to the present embodiment will be described.

Figure 4:
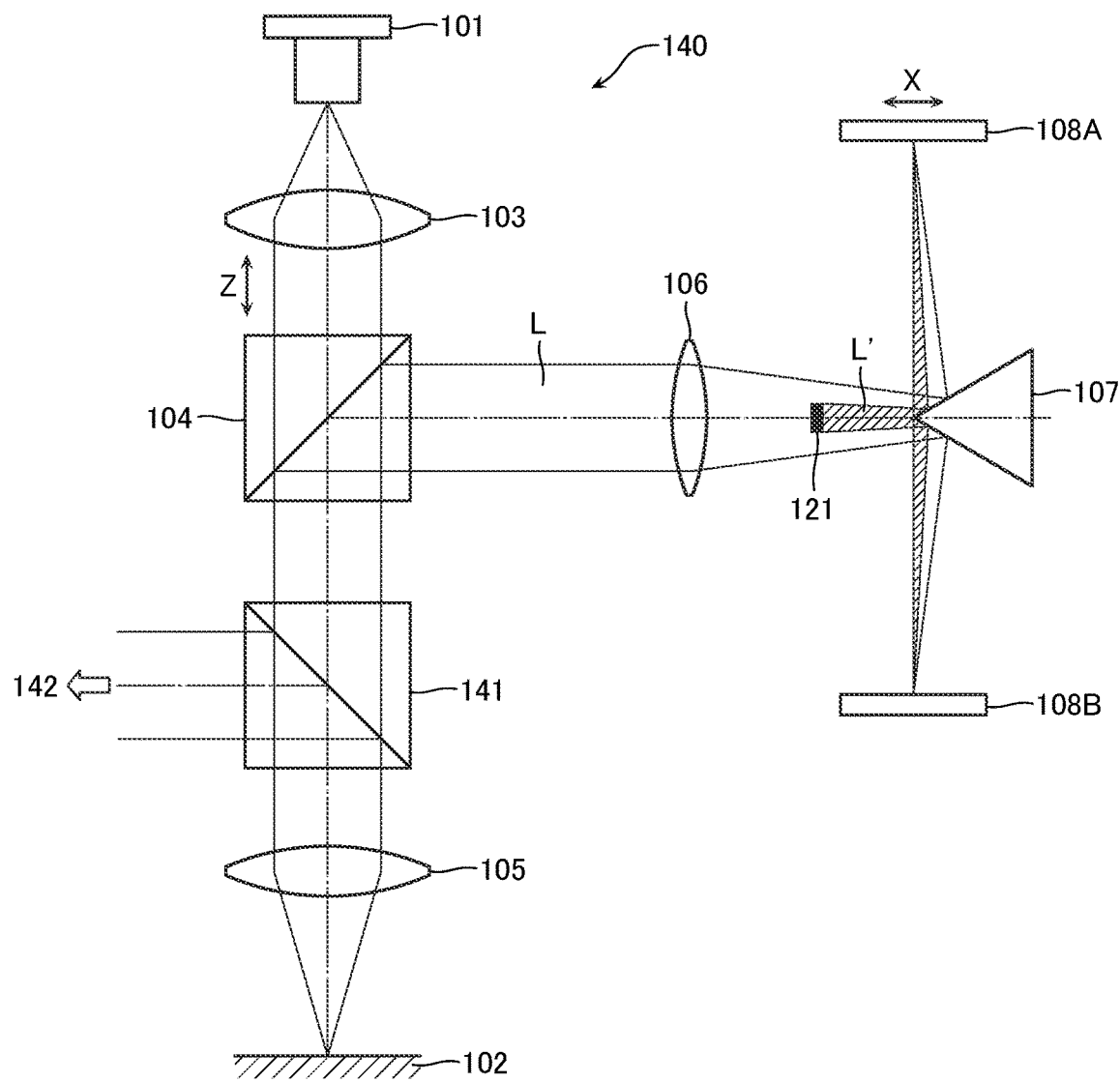
FIG. 4 is a view showing another configuration of the optical pickup device according to the same embodiment.
Figure 5:
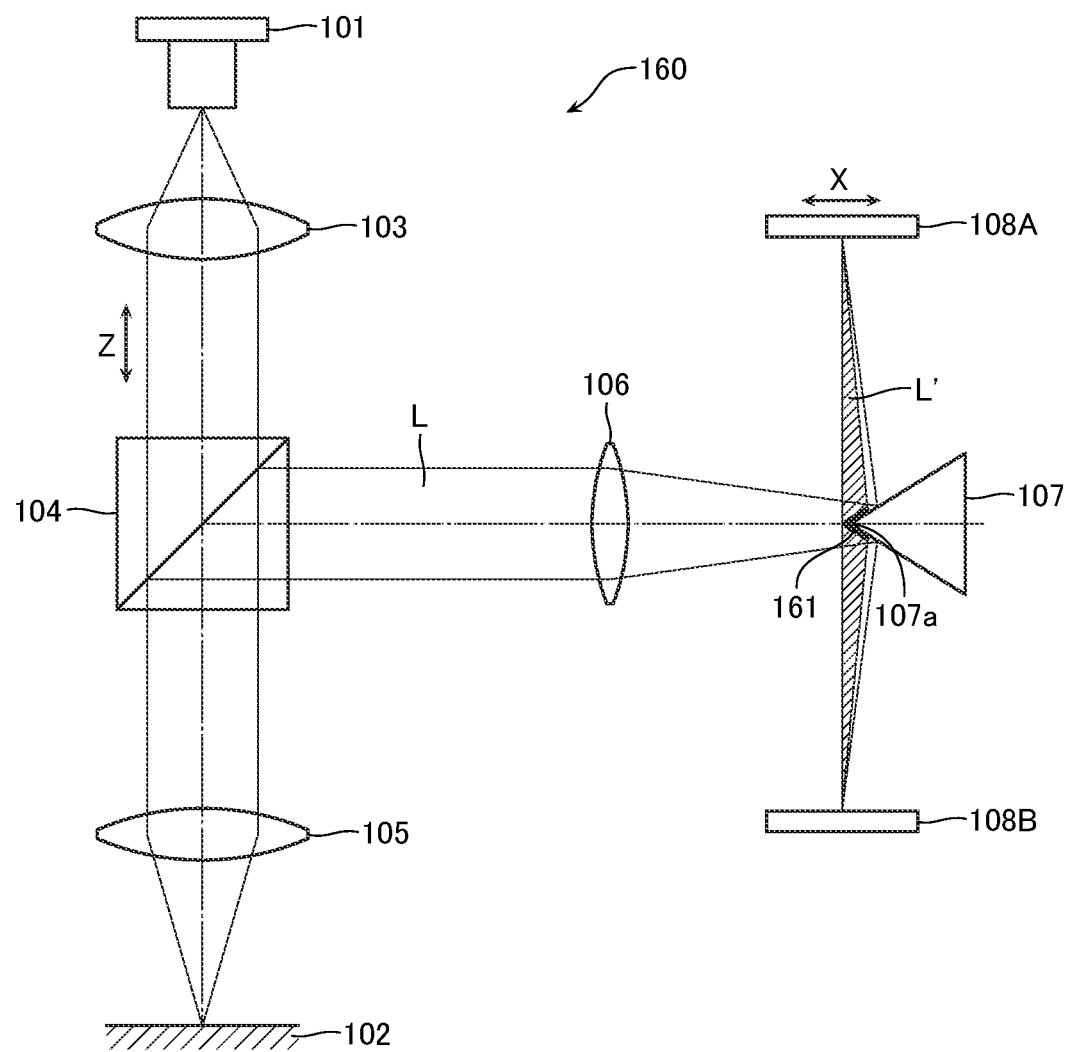
FIG. 5 is a view showing another configuration of the optical pickup device according to the same embodiment.
Figure 6:
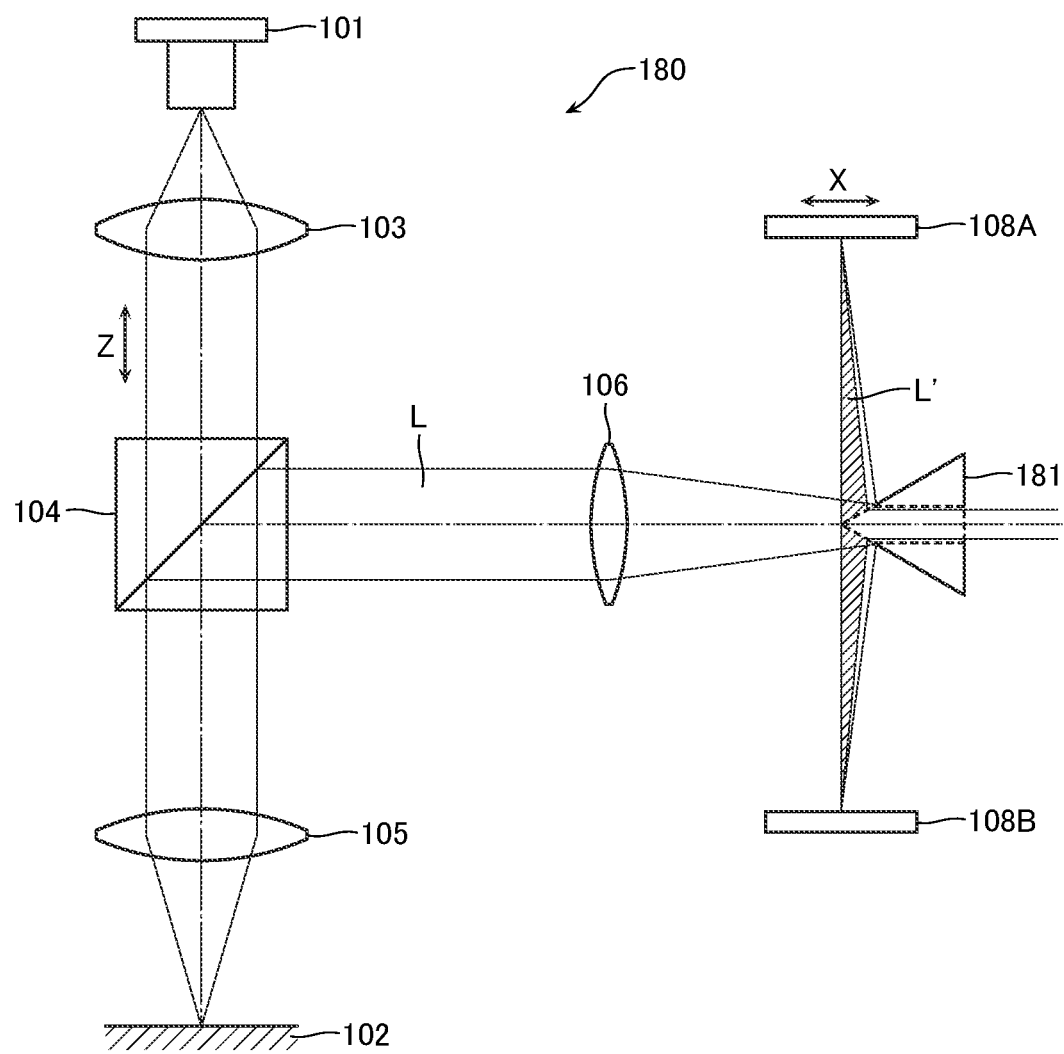
FIG. 6 is a view showing another configuration of the optical pickup device according to the same embodiment.

FIGS. 4 to 6 are views showing other configurations of the optical pickup device according to the present embodiment. Configurations similar to the configurations shown in FIG. 1, of the configurations shown in FIGS. 4 to 6 are assigned with the same symbols as in FIG. 1.

FIG. 4 is an example of an optical pickup device 140 including an image observation system 142 for observing the workpiece 102. The optical pickup device 140, in addition to including the configurations of the optical pickup device 120, includes also a beam splitter 141 disposed between the beam splitter 104 and the object lens 105 on the optical path of the light beam L. This beam splitter 141 is included in the imaging optical system. This beam splitter 141 separates part of the reflected beam L reflected by the workpiece 102 to provide the separated part of the reflected beam L to the image observation system 142. However, the light beam L after the range-to-be-adjusted L' has been shielded cannot be employed by the image observation system 142. Therefore, in the case of the optical pickup device 140, the light shielding plate 121 must be disposed between the beam splitter 141 and the line sensor 108 on the optical path of the light beam L. In the case of the example of FIG. 4, the light shielding plate 121 is disposed between the imaging lens 106 and the triangular prism 107.

FIGS. 5 and 6 are examples of optical pickup devices 160 and 180 in which by contriving the triangular prism 107, the range-to-be-adjusted L' of the light beam L is adjusted to be disabled.

In the case of the optical pickup device 160, the vertex angle part 107a of the triangular prism 107 is coated with a light shielding material 161 that shields the light beam L to prevent the light beam L from being reflected. This light shielding material 161 functions as the peak separation part. In this case, the light beam of the range-to-be-adjusted L' irradiated from the imaging lens 106 is not reflected, hence, as a result, the range-to-be-adjusted L' of the light beam L is disabled.

The optical pickup device 180, instead of including the triangular prism 107, includes a triangular prism 181 that has formed therein a path allowing only the range-to-be-adjusted L' of the light beam L to pass through unchanged. This triangular prism 181 functions as the peak separation part. Due to this optical pickup device 180, the range-to-beadjusted L' of the light beam L ceases to reach the line sensor 108, hence, as a result, the range-to-be-adjusted L' of the light beam L is disabled. Note that even if the triangular prism 107 is divided along the optical axis of the light beam L and each portion is disposed on the outside of the range-to-be-adjusted L', it acts similarly to the triangular prism 181.

The above-described optical pickup devices 140, 160, and 180 are examples of the present embodiment, but in all of these devices, the range-to-be-adjusted L' of the light beam L can be disabled before the line sensor 108 is reached. As a result, all of these devices can separate peaks of the signal intensity distributions of the surface reflected beam La and the back reflected beam Lb in the line sensor 108, similarly to the optical pickup device 120.

As described above, the present embodiment makes it possible to provide an optical pickup device that reduces focus errors during focus detection on a workpiece of a transparent body, while maintaining the advantage of the knife edge method of a broad range focus detection range.

Second Embodiment

The first embodiment described an optical pickup device that by employing the likes of a light shielding plate as a peak separation part, later disabled a range-to-be-adjusted of a light beam outputted from a semiconductor laser. In contrast, a second embodiment will describe an optical pickup device 200 that adjusts characteristics themselves of the light beam outputted from the semiconductor laser.

Figure 7:
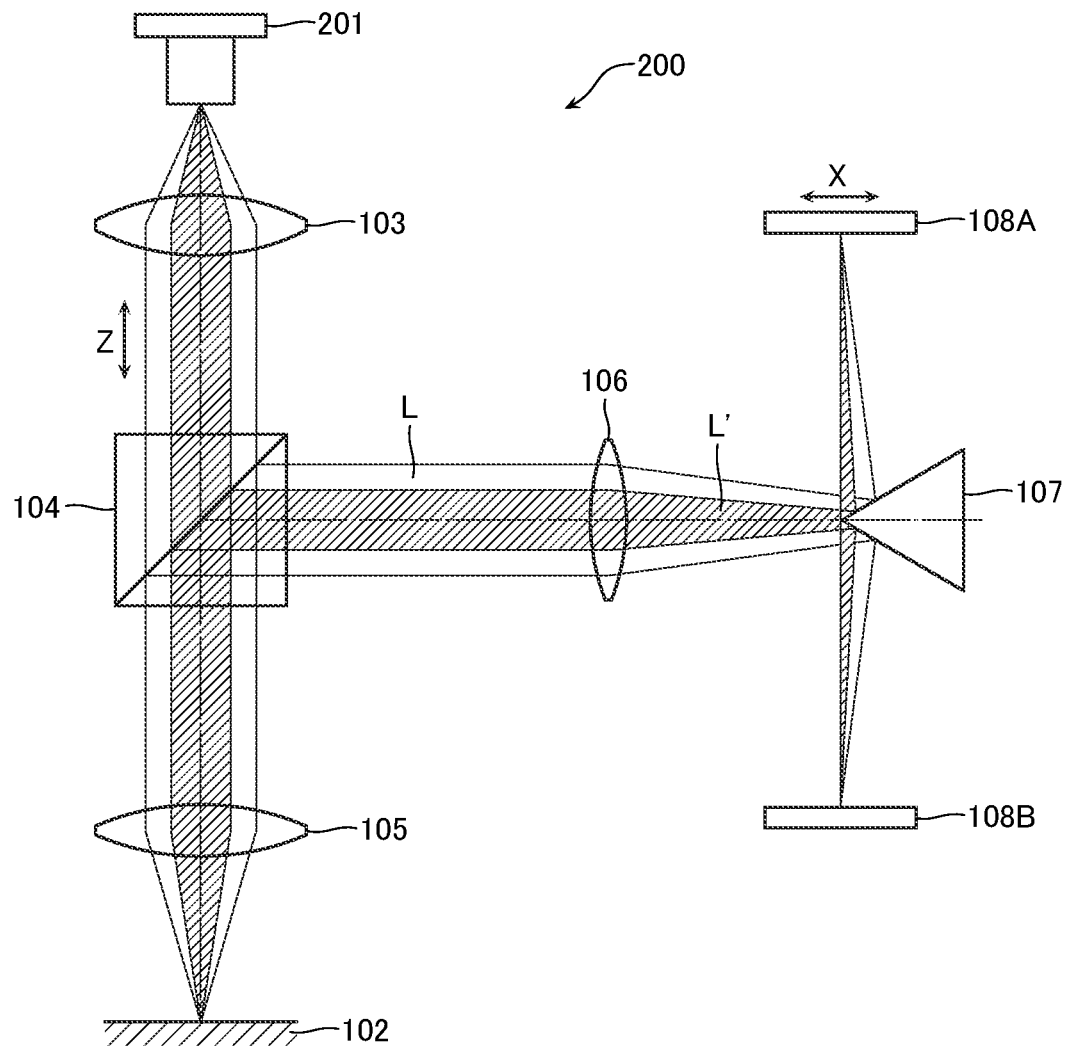
FIG. 7 is a view showing a configuration of an optical pickup device according to a second embodiment.
Figure 8:
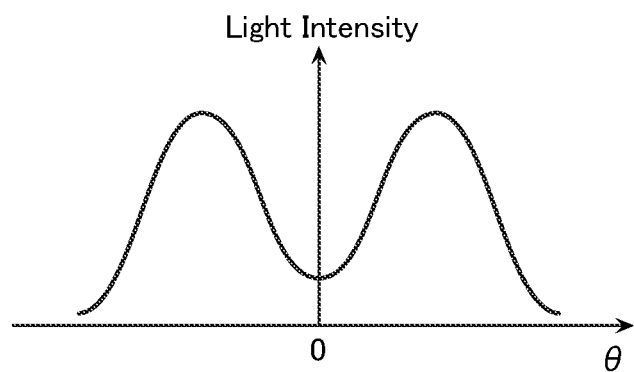
FIG. 8 is a graph showing a relationship between a radiation angle of a light beam outputted from a semiconductor laser and light intensity, of the optical pickup device according to the same embodiment.

FIG. 7 is a view showing a configuration of the optical pickup device according to the present embodiment; and FIG. 8 is a graph showing light intensity with respect to radiation angle of the light beam outputted from the semiconductor laser of the same optical pickup device. Configurations similar to the configurations shown in FIG. 1, of the configurations shown in FIG. 7 are assigned with the same symbols as in FIG. 1.

The optical pickup device 200 is configured by substituting the semiconductor laser 101 of the configuration of the optical pickup device 100 by a semiconductor laser 201. The semiconductor laser 201 functions not only as the light receiving part, but also as the peak separation part. As shown in FIG. 8, this semiconductor laser 201, in the case that an optical axis direction of the light beam L is assumed to be 0°, outputs the light beam L having a light intensity that weakens from an optical axis peripheral part where the radiation angle θ has a certain value to the optical axis where the radiation angle is θ=0°. As a result, light intensity of the range-to-be-adjusted L' shown by the oblique lines of FIG. 7 of the irradiating beam L from during output by the semiconductor laser 101 is adjusted to be weakened, hence the range-to-be-adjusted L' is relatively disabled compared to another range. As a result, since the reflected beam L is projected obliquely onto the workpiece 102 and the line sensor 108 in the optical pickup device 200, the optical pickup device 200 makes it possible to separate peaks of the signal intensity distributions of the surface reflected beam La and the back reflected beam Lb, similarly to the optical pickup device 120, even when the workpiece 102 is a transparent body.

From the above, the present embodiment makes it possible to obtain similar advantages to those of the first embodiment by employing a semiconductor laser that outputs a light beam having a weakened light intensity close to the optical axis direction of the light beam.

Third Embodiment

The first and second embodiments described optical pickup devices in which a range-to-be-adjusted of a light beam was disabled or light intensity close to an optical axis was weakened. In contrast, a third embodiment will describe an optical pickup device 300 that separates peaks of signal intensity distributions of reflected beams in a line sensor by utilizing refraction of a light beam by a prism.

Figure 9:
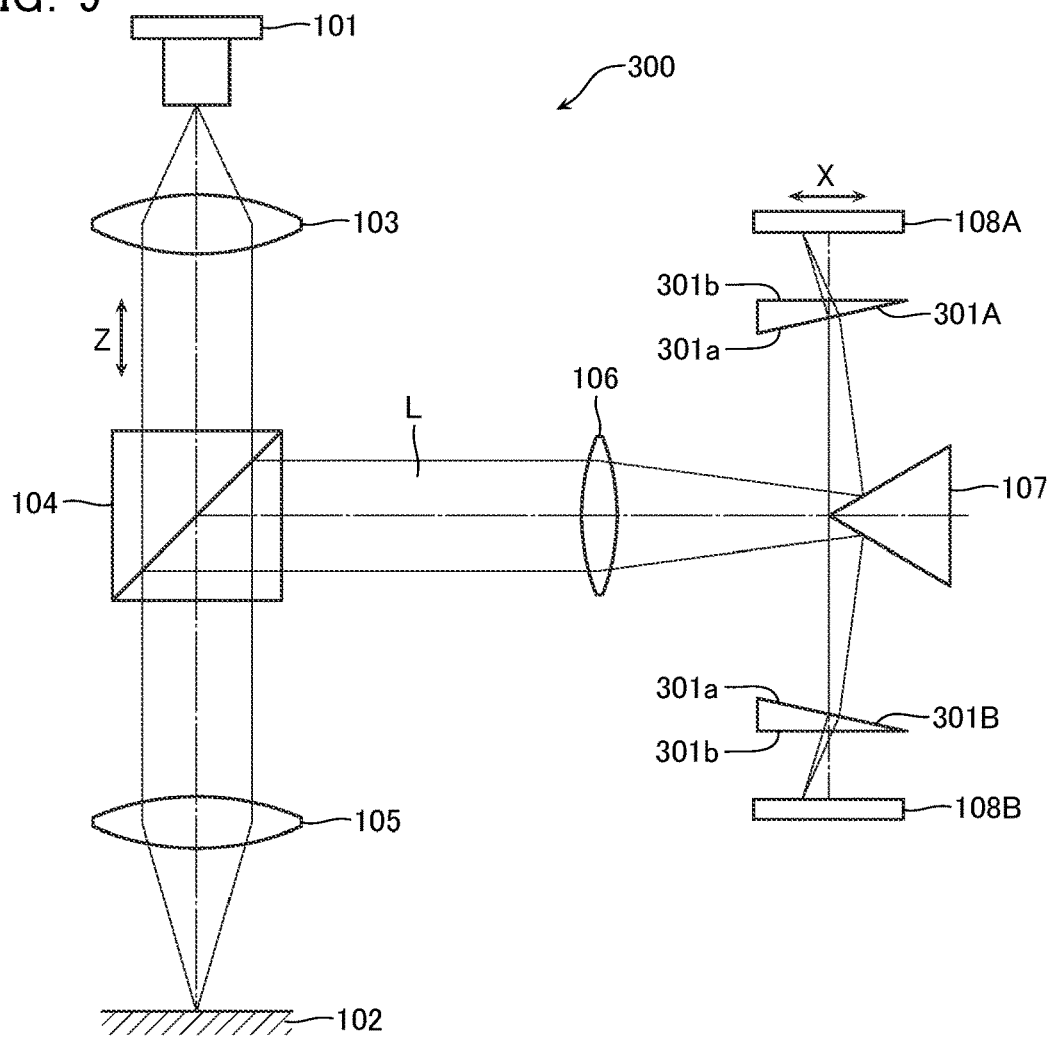
FIG. 9 is a view showing a configuration of an optical pickup device according to a third embodiment.

FIG. 9 is a view showing a configuration of the optical pickup device according to the present embodiment.

The optical pickup device 300, in addition to including the configurations of the optical pickup device 100, includes also prisms 301A and 301B that are disposed between the triangular prism 107 of the imaging optical system and the line sensors 108A and 108B on the optical path of the light beam L, and that refract the reflected beam L. In the description below, the prisms 301A and 301B are sometimes also referred to simply as a "prism 301", except when there is a need to specify. Each of the prisms 301 has: an incident surface 301a that extends obliquely to the X direction on a triangular prism 107 side; and an emission surface 301b that extends in the X direction on a line sensor 108 side. Each prism 301 functions as the peak separation part.

Figure 10:
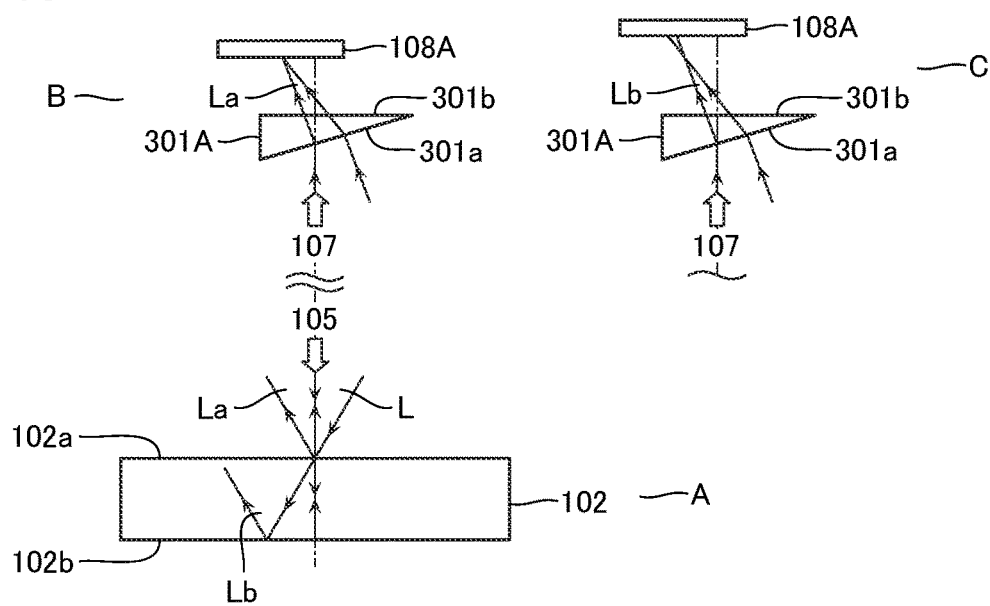
FIG. 10 is a view showing a state of reflection of a light beam in a workpiece and a state of light reception of a light beam by a line sensor, of the optical pickup device according to the same embodiment.
Figure 11:
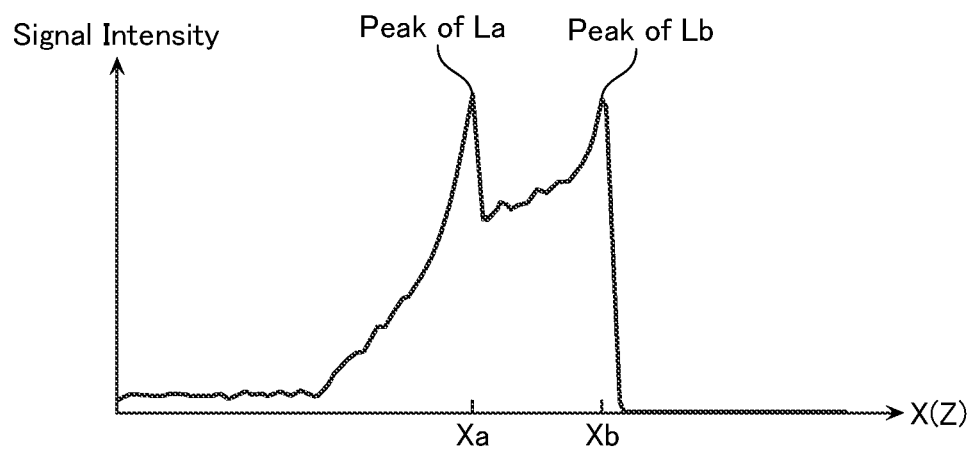
FIG. 11 is a graph showing a relationship between a position of a light receiving element of a line sensor and signal intensity, of the optical pickup device according to the same embodiment.

FIG. 10 is a view showing a state of reflection of the light beam in the workpiece (A in FIG. 10) and a state of light reception of the light beam by the line sensor (B and C in FIG. 10), of the optical pickup device according to the present embodiment. A in FIG. 10 shows the case where the workpiece 102 is irradiated by as much as half of the light beam L, in order that features of a knife edge method in the optical pickup device 300 become apparent. B in FIG. 10 is a view related to the surface reflected beam La; and C in FIG. 10 is a view related to the back reflected beam Lb. Moreover, FIG. 11 is a graph showing a relationship between a position of the light receiving element of the line sensor and signal intensity, of the optical pickup device according to the present embodiment. In the graph shown in FIG. 11, the horizontal axis is a position in the X direction of each of the light receiving elements of the line sensor 108, and the vertical axis is the signal intensity. The position in the X direction of each of the light receiving elements of the line sensor 108 corresponds to a distance in the Z direction between the irradiation optical system and the workpiece 102.

FIG. 10 is an example where a transparent body of the likes of glass has been adopted as the workpiece 102, and a position of the surface 102a of the workpiece 102 is in focus.

As shown in A in FIG. 10, the irradiating beam L outputted from the semiconductor laser 101 is reflected along the optical axis of the light beam L at the surface 102a and the back 102b of the workpiece 102. The reflected beam L passes through the object lens 105, the beam splitter 104, and the imaging lens 106, and is then reflected by the triangular prism 107 and enters the prism 301 by the incident surface 301a. The light beam L that has entered the prism 301 is refracted such that its optical axis becomes oblique to the X direction in the prism 301, and is received by the line sensor 108. At this time, as shown in B and C in FIG. 10, the surface reflected beam La and the back reflected beam Lb end up proceeding having different optical path lengths in the prism 301. Therefore, a difference appears also in shift amounts in the X direction of the signal intensity distributions of the surface reflected beam La and the back reflected beam Lb. As a result, as shown in FIG. 11, the peaks Xa and Xb of the signal intensity distributions of the surface reflected beam La and the back reflected beam Lb appear separated in the line sensor 108. As a result, the peak of the signal intensity distribution of the surface reflected beam La becomes clear, hence focus errors during focus detection on a workpiece of a transparent body are reduced.

As described above, the present embodiment allows similar advantages to those of the first and second embodiments to be obtained. Furthermore, in the case of the present embodiment, since refraction of the reflected beam by a prism is utilized in peak separation of the signal intensity distributions, loss of the reflected beam can be more reduced and consequently SN ratio during focus detection can be more improved, compared to in the first and second embodiments. In other words, the present embodiment makes it possible to provide an optical pickup device capable of higher precision focusing on a workpiece of a transparent body than those of the first and second embodiments are.

What is claimed is:

1. An optical pickup device, comprising:
   a light source that outputs a light beam;
   an irradiation optical system that projects onto a measurement target the light beam outputted from the light source;
   an imaging optical system that converges and images the light beam reflected by the measurement target;
   a light receiving part that receives the light beam imaged by the imaging optical system; and
   a peak separation part disposed on an axis of the light beam between the light source and the light receiving part for shielding a center range of the light beam including a light passing along the axis of the light beam and passing an outside of the center range of the light beam, wherein
   the light receiving part has a light receiving surface having a plurality of light receiving elements arranged in a certain direction to detect the light beam image,
   the imaging optical system includes a mirror that reflects the outside of the center range of the light beam, and
   the mirror is disposed on the outside of the center range of the light beam, and the mirror serves also as the peak separation part.

2. The optical pickup device according to claim 1, further comprising
   an image observation system that observes an image of the measurement target,
   wherein the imaging optical system includes a beam splitter that divides and sends to the image observation system part of the light beam reflected by the measurement target, and
   the peak separation part is disposed between the beam splitter and the light receiving part on the optical path of the light beam.

* * * * *